No. 703,674. Patented July 1, 1902.
E. A. SPERRY.
CONNECTION FOR BATTERIES.
(Application filed Nov. 6, 1899.)
(No Model.)

Witnesses:
F. Griswold.
Walter L. Upson.

Inventor.
Elmer A. Sperry.
by Buckingham & Evarts
attys.

THE NORRIS PETERS CO., PHOTO-LITHO., WASHINGTON, D. C.

UNITED STATES PATENT OFFICE.

ELMER A. SPERRY, OF CLEVELAND, OHIO, ASSIGNOR, BY MESNE ASSIGNMENTS, TO NATIONAL BATTERY COMPANY, A CORPORATION OF NEW JERSEY.

CONNECTION FOR BATTERIES.

SPECIFICATION forming part of Letters Patent No. 703,674, dated July 1, 1902.

Original application filed September 13, 1899, Serial No. 730,320. Divided and this application filed November 6, 1899. Serial No. 735,971. (No model.)

*To all whom it may concern:*

Be it known that I, ELMER A. SPERRY, a citizen of the United States, residing at Cleveland, in the county of Cuyahoga and State of Ohio, have invented new and useful Improvements in Connections for Batteries, of which the following is a specification.

This invention relates to storage batteries wherein metallic vessels having thin walls are used as part of the cells or as containing vessels; and it consists also in means for collecting and distributing the currents generated and also in the means for coupling the elements of the batteries.

It has for its object to cheapen the manufacture and to reduce the weight of storage batteries and to provide means whereby storage batteries may be rendered more portable, especially under conditions of severe service, this application being a division of application for Letters Patent No. 730,320, filed September 13, 1899, for electric batteries and mounting same.

Figure 1:
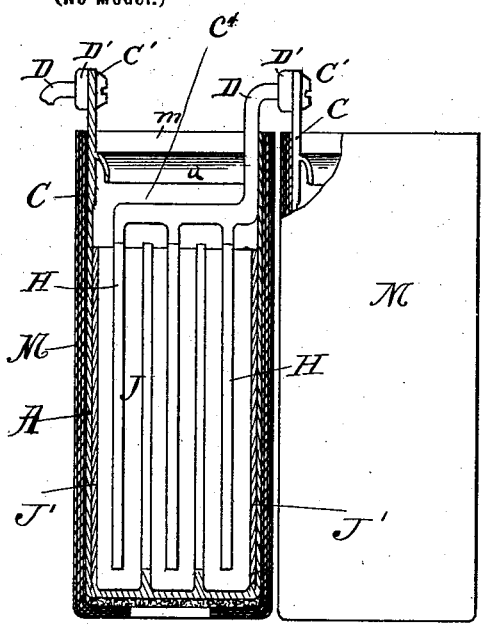
Figure 2:
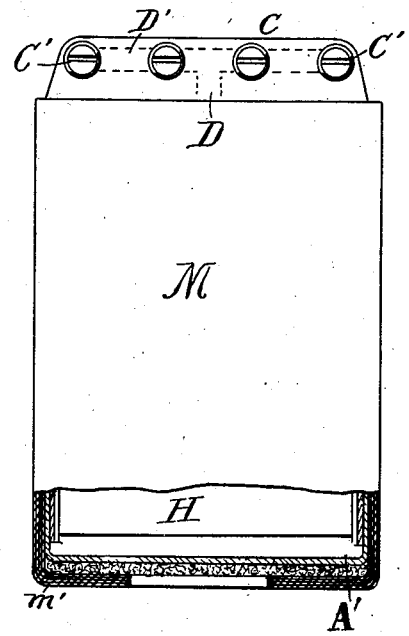
Figure 3:
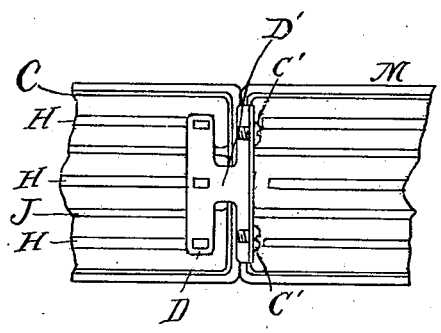
Figure 4:
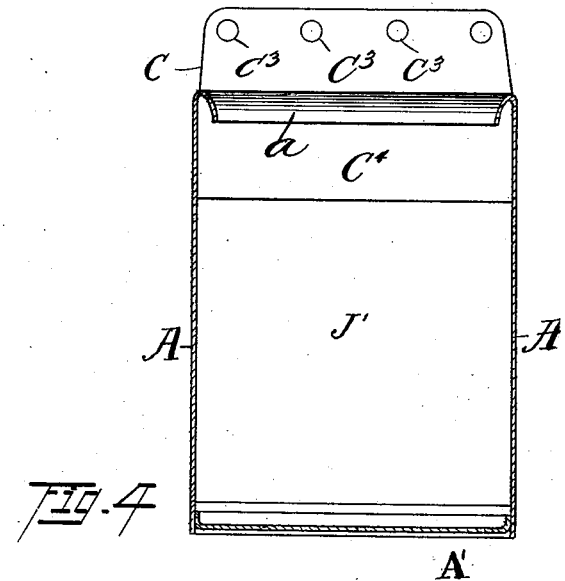

In the accompanying drawings, Figure 1 illustrates an end elevation, partly in section, of a pair of cells, showing one form of coupling the same. Fig. 2 represents a side elevation of the same. Fig. 3 is a plan view of a pair of cells that are coupled together. Fig. 4 is a detail view of a portion of one of the cell-cases.

The case or receptacle A consists of thin sheets of lead or a suitable alloy thereof, which are cut, folded, and put together to form a rectangular cup having a tight bottom A'. The edges around the bottom and also two or more of the corners of the case are preferably strengthened by solid masses of metal formed by lead burning or soldering when the sheets are placed together. The case itself may be used as a part of the negative element of the cell, and active material J' may be applied thereto in any well-known manner and become a part of the same. The positive element H of the cell may be insulated from the case in any suitable manner.

The walls of the case are provided with an extension $C^4$, that is slightly thicker than the walls of the case, that is formed integral therewith or which is secured thereto by lead-burning or otherwise, so as to insure a close and permanent joint between the extension and the walls of the case. This extension is preferably tubular and projects a suitable distance above the electrodes to prevent the spilling, splashing, or running over of the electrolyte. The top of the extension is preferably bent inward and downward to form an inwardly-projecting lip $a$, having a clear space between the lip and the wall, which assists in retaining the electrolyte and also provides additional means for collecting and conducting the electricity. The projecting extension is provided on one side of the case with an upwardly-extending flange practically coextensive with the side of the case to provide for the accumulation of the electricity collected by the inwardly-projecting lip $a$. Said flange forms one of the terminals C of the cell and is pierced with a plurality of holes $C^3$, which receive the screws C', whereby said terminal and the coöperating terminal D of the adjacent cell are secured together. The terminal D is provided with a head D', practically coextensive with the terminal C, as shown in dotted lines in Fig. 2, whereby large currents may be handled without melting the terminals, which are made very thin.

Since the walls of the cell are extremely thin they must be supported to prevent buckling. This support is preferably effected by wrapping each cell with an insulating mass—such, for instance, as tarred felt or fiber M—which preferably is applied so that it shall extend above the top of the extension $C^4$, as shown at $m$ in Fig. 1. Preferably the insulation is applied in a number of layers $m'$, which are arranged so that they fold under the bottom of the case and provide a reinforcement therefor. A stiff plate N of suitable insulating material, such as hard rubber, is preferably interposed between the bottom A' of the case and the insulating material M to provide additional support for the bottom, which is also made extremely thin.

It will be understood that wherever lead is referred to in the specification it includes not only pure lead, but also lead alloyed with more or less foreign substances or metals, such as antimony, and that various changes in the construction herein set forth may be made without departing from the spirit of the invention, provided the means set forth in any one of the following claims be employed.

I claim as my invention—

1. In a battery, a case having its walls formed of thin conducting material, an electrolyte within the case, said case being provided with an extension projecting above the electrolyte, said extension being thicker than the walls of the case and being provided with a terminal having a broad contacting surface, and an insulating-support for the walls of said case.

2. In a battery, a case having its walls formed of thin conducting material, an electrolyte within the case, said case being extended upward above the level of the electrolyte, a terminal for an electric conductor carried by said extended portion of the case, said case being provided with an internal lip or flange arranged between the upper surface of the electrolyte and the top of the case, substantially as set forth.

3. In a battery, a case having its walls formed of thin conducting material, an electrolyte within the case, said case being provided with an extension thicker than the walls of the case and having a terminal substantially coextensive with one of the walls of the case formed integral therewith, and an insulating-support for the walls of said case, substantially as described.

4. In a battery, a case having its walls formed of thin conducting material, an electrolyte within the case, said case being provided with an extension thicker than the walls of the case and having a terminal with a broad contacting surface formed integral therewith, an insulating-support for said case comprising an envelop of flexible material, said envelop having its ends folded or bent under the bottom of the case, and a stiffening-plate interposed between the bottom of the case and said folded portion of insulating material, substantially as set forth.

5. In a battery, a case having its walls formed of thin conducting material, an electrolyte in said case, said walls being extended beyond the top of the electrolyte and provided with an inwardly-projecting flange or lip arranged between the surface of the electrolyte and the top of the case, and an insulating-support for said case comprising an envelop of flexible material having its ends folded or bent under the bottom of the case, substantially as set forth.

6. In a battery, a case having its walls formed of thin conducting material, an electrolyte within the case, the walls of said case being extended beyond the surface of the electrolyte, one of said walls being further extended to form a terminal for an electric conductor having a broad contacting surface, and an insulating-support for said case comprising a plurality of layers of insulating material, substantially as described.

7. In a battery, a case for containing an electrolyte having its walls formed of thin conducting material, the said walls being extended as a tubular section $C^4$ beyond the surface of the electrolyte and the said tubular section being relatively thick, and one of the sides of the said tubular extension being continued to form a terminal C for an electric conductor, and the said tubular extension being provided upon its inner surfaces with a flange or projection $a$ situated between the upper edge of the tubular extension and the upper surface of the electrolyte, substantially as set forth.

In testimony whereof I have hereunto set my hand in presence of two subscribing witnesses.

ELMER A. SPERRY.

Witnesses:
W. S. ROGERS,
M. C. PRENDERGAST.